United States Patent [19]

Matsushita et al.

[11] Patent Number: 5,331,598
[45] Date of Patent: Jul. 19, 1994

[54] MEMORY CONTROL DEVICE

[76] Inventors: Tsukasa Matsushita; Akira Shimatani, both of c/o Mita Industrial Co., Ltd., 2-28, 1-chome, Tamatsukuri, Chuo-ku, Osaka 540, Japan

[21] Appl. No.: 987,159

[22] Filed: Dec. 8, 1992

[30] Foreign Application Priority Data

Dec. 9, 1991 [JP] Japan .................... 3-324764

[51] Int. Cl.[5] ............................... G11C 7/00
[52] U.S. Cl. .................... 365/221; 365/78; 365/189.12; 365/239; 365/240
[58] Field of Search ............ 365/221, 239, 240, 78, 365/189.01, 189.12, 189.05, 219, 189.07; 358/404, 444, 468

[56] References Cited

U.S. PATENT DOCUMENTS

| | | | |
|---|---|---|---|
| 4,037,203 | 7/1977 | Stalley | 364/900 |
| 4,839,866 | 6/1989 | Ward et al. | 365/221 |
| 5,157,633 | 10/1992 | Aoki | 365/221 |
| 5,198,999 | 3/1993 | Abe et al. | 365/189.05 |
| 5,200,925 | 4/1993 | Morooka | 365/219 |

FOREIGN PATENT DOCUMENTS

| | | | |
|---|---|---|---|
| 0299264 | 1/1989 | European Pat. Off. | 365/221 |
| 0341887 | 11/1989 | European Pat. Off. | 365/221 |

OTHER PUBLICATIONS

Patent Abstracts of Japan, vol. 6, No. 112, Jun. 23, 1982 & JP-A-57 040 800.

*Primary Examiner*—Eugene R. LaRoche
*Assistant Examiner*—Son Mai

[57] ABSTRACT

A memory control device for controlling writing and reading data in and from a line memory made up of a plurality of FIFO memories. Writing clocks are circularly applied to the plurality of FIFO memories of the line memory. Also, reading clocks are circularly applied to the plurality of FIFO memories. Thus, although data written in the FIFO memories are discrete, data circularly read from the plurality of FIFO memories are sequential in such order as they are written in the line memory.

31 Claims, 10 Drawing Sheets

MEMORY CONTROL DEVICE

BACKGROUND OF THE INVENTION

1. Field of the Invention

The present invention relates to a memory control device interposed between a pair of function circuits, such as image processing circuits in a digital copying machine, for controlling a memory, such as a line memory storing a single line of data.

2. Description of the Prior Art

There has been commonly used a digital copying machine where an image scanner, for example, optically reads an image on an original sheet to obtain image data, and then, after the image data is processed in various ways, such as outline emphasizing, black and white inverting, and the like, an image is reproduced on a copying sheet. Image formation in such a copying machine, for example, is accomplished by scanning a surface of a photoconductor with laser light modulated in accordance with the image data to form an electrostatic latent image, developing the electrostatic latent image into a toner image, and translating and fixing the toner image on a copying sheet.

Original image data corresponding to an output signal from the image scanner is generally processed in any of several ways, such as outline emphasizing, black and white inverting, shading and the like. In order to perform such various ways of image processing, an image processor may include a page memory which can store a page of image data and implement a series of operations to process the image data stored in the page memory. However, it is undesirable to use a large capacity page memory, because this causes an increase in manufacturing cost for the device. Hence, usually such a page memory is not used, and instead a pipeline organization is employed in which image data that has been processed in an image processing circuit is directly transferred to another image processing circuit for the next step of image processing, and in this way, the image data is processed by stages.

With such a pipeline organization, a line memory, which has a single line of storage capacity corresponding to a single scanning line along which an image scanner scans an original sheet, is interposed between the image processing circuits. The reason for this is that in image processing in a digital copying machine, for example, a horizontal synchronizing signal, which provides timing for the start of processing each single line of data, acts as a reference signal. The image processing circuits are reset in accordance with the horizontal synchronizing signal, and thereafter, processing of a single line of image data is started. If any image processing circuit is reset by the horizontal synchronizing signal in the course of processing a single line of image data, the processing of the single line of image data is interrupted, and the desired image processing may not be completed. Hence, it is necessary for the image processing circuit to take data at a specified timing related to the horizontal synchronizing signal to complete the processing of the single line of image data before it is reset in accordance with the horizontal synchronizing signal. It is also necessary to save a single line of image data for a period when the image processing circuit is reset in accordance with the horizontal synchronizing signal. Thus, it is required to provide a line memory which can save a single line of data at the previous and subsequent stages of each image processing circuit.

On the other hand, complicated image processing such as moving an image can be implemented by combining various functions all of which can be completed within a period corresponding to a single cycle of the horizontal synchronizing signal. In this case, the image processing circuits for implementing various functions are generally designed individually. Thus, it is preferable that each image processing circuit be separated from other image processing circuits at its previous and subsequent stages. In view of this, it is necessary to provide a line memory between each pair of the image processing circuits.

FIG. 6 illustrates an exemplary structure where a line memory is interposed between each pair of adjacent image processing circuits. Line memories 3 and 4 are installed before and after image processing circuits 1 and 2. For the line memories 3 and 4, a first-in first-out memory (referred to as "FIFO memory" hereinafter) is generally used. The reason for this is that both the device structure and processing procedure can be simplified since there is no need to generate addresses for FIFO memories and writing and reading data can be simultaneously performed in and from a single memory.

The line memories 3 and 4 write and read image data based upon a system clock SCLK to control transfer of the image data. The line memories 3 and 4 commonly receive a reading authorizing signal MRE having a fixed timing related to the above-mentioned horizontal synchronizing signal, and the image data is read from the line memories 3 and 4 with common timing. The image processing circuits 1 and 2 also commonly receive the reading authorizing signal MRE and produce a writing authorizing signal MWE of which timing is determined based upon the reading authorizing signal MRE and the time required for an inside processing.

When the image processing circuit 1 is designed to conduct an inversion operation for inverting black and white, for example, the image processing circuit 1 is constructed as illustrated in FIG. 7. As can be seen, 8 bit data delivered by a line 6 is temporarily latched by a latch circuit 7A, based upon a system clock SCLK, and then is inverted by an inverting circuit 8, and thereafter, is latched by a latch circuit 7B and then output to a line 9. It takes two clocks to complete this inverting procedure through the latch circuits 7A and 7B. Hence, the image processing circuit 1 includes latch circuits 10A and 10B for delaying the reading authorizing signal MRE by two clocks, and a signal passing through the latch circuits 10A and 10B is applied to a line memory 4 at the next stage to act as the writing authorizing signal MWE. Thus, two clocks after the reading authorizing signal MRE is produced and the first data is input to the image processing circuit 1 from the line 6, the writing authorizing signal MWE is produced, and the first data processed on the basis of black and white inversion is delivered by the line 9 to write it in the line memory 4 at the next stage.

FIG. 8 is a timing chart illustrating operation of the structure shown in FIG. 6. The horizontal synchronizing signal HSYNC is a negative logic signal (marked with overline in FIG. 8), and in response to its falling, the image processing circuits 1 and 2 are reset. A fixed time $\Delta T1$ after the rising of the horizontal synchronizing signal HSYNC, the reading authorizing signal MRE rises. For a period the reading authorizing signal MRE is at High level, data stored in the line memories 3 and 4 are sequentially read based upon the system clock SCLK.

The image processing circuit 1 permits the writing authorizing signal MWE to rise at time t42 two system clocks SCLK after time t41 at which the reading authorizing signal MRE rises. This results in image data processed for the two-clock period being written in the line memory 4 at the next stage in a period subsequent to time t42.

The reading authorizing signal MRE maintains a status of High level over a period AT2 required for reading a single line of data. When the reading authorizing signal MRE falls at time t43, the writing authorizing signal MWE falls at time t44 two clocks later the falling. Thus, a single line of data is processed on the basis of the black and white inversion which requires two clocks, and the data processed in this way is stored in the line memory 4.

Although the number of clocks spent for the processing varies from one image processing circuit to another, it is necessary to complete a sequence of processing steps from reading data from the line memory at the previous stage to writing data in the line memory at the next stage in a period ΔTH before the horizontal signal HSYNC again falls, because all of the image processing circuits are reset when the horizontal synchronizing signal HSYNC falls, as stated above. On or before the time the horizontal synchronizing signal HSYNC falls, the image data must be saved in the line memory.

Thus, the number of clocks used in the processing steps in the image processing circuits must be determined so that falling of the writing authorizing signal MWE, which is caused the same number of clocks after falling of the reading authorizing signal MRE, is caused before to falling of the horizontal synchronizing signal HSYNC. In other words, the maximum period of time which can be required for the image processing circuits to complete the required processing is a period corresponding to a period AT3 from the falling of the reading authorizing signal MRE to the falling of the horizontal synchronizing signal HSYNC.

In the case of a digital copying machine capable of copying an original sheet of Japan Industrial Standard Line A, Number 0 (referred to as "A0 size" hereinafter) at its maximum, for line memories 3 and 4, a memory must be used which can store image data consisting of dots corresponding in number to a length of a longer side (corresponding to the length of the shorter side of an A0 size sheet) of a sheet of Japan Industrial Standard Line A, Number 1 (referred to as "A1 size" hereinafter). To constitute such a line memory having a large capacity, a single FIFO memory having a storage capacity corresponding to the number of dots contained in the A1 size sheet may be used, and otherwise a special FIFO memory which can allow a signal for memory extension to be output may be used, arranged in cascade connection. However, such large capacity FIFO memory and special FIFO memory are expensive, and therefore, there lies the disadvantage that the intended apparatus costs more.

Accordingly, there has been proposed a low-priced large-capacity line memory in which a plurality of ordinary FIFO memories which cannot output a signal for memory extension are used, and a memory control device regulates the timing of operations of the plurality of FIFO memories.

FIG. 9 is a block diagram showing a basic structure of the memory control device in the case where a line memory is comprised of three FIFO memories. In FIG. 9, an overline is added to symbols designating signals and the like to show that those signals are in a status of negative logic, but such drawing overline is omitted in this description. A digital copying machine capable of copying an A0 size original sheet would require a storage capacity of about 15,000 dots so as to cover the number of dots of a longer side of an A1 size sheet. Therefore, each of the three FIFO memories has a storage capacity of about 5,000 dots. For example, in reading an image at a density of 400 dots per inch (25.4 mm), the required storage capacity for reading 840 mm length of the shorter side of an A0 size sheet is as follows:

$$840 \times 400 \div 25.4 = 13,228 \text{ (dots)}$$

In this case, for example, an image scanner having 14,848 dots for reading may be used. Thus, it is calculated that the line memory must have a storage capacity of about 15,000 dots.

Corresponding to each line memory interposed between each pair of the image processing circuits, memory control circuits 5-1, 5-2, ..., 5-k (referred to as "memory control circuit 5" en bloc; k is an integer 1 smaller than the number of the image processing circuits) are provided. Each of the memory control circuits 5 includes a counter 11 capable of counting the system clock SCLK and counting 15,000 or more. Also, each of the memory control circuits 5 includes three comparators 12A, 12B and 12C for comparing reference values "4,998", "9,998" and "14,998" with the count value of the counter 11, respectively, to produce a signal at High level upon coincidence.

Signals output from the comparators 12A, 12B, 12C are applied through OR gates 13A, 13B, 13C to input terminals of flip flops 14A, 14B, 14C, respectively. The signals output from the OR gates 13A, 13B, 13C are latched by the flip flops 14A, 14B, 14C, respectively, synchronizing with the rising of the system clock SCLK. Q bar output signals (inverted output signals) of the flip flops 14A, 14B, 14C are applied through AND gates 15A, 15B, 15C to data input terminals of the flip flops 16A, 16B, 16C, respectively. The signals output from the AND gates 15A, 15B, 15C are latched by the flip flops 16A, 16B, 16C, respectively, synchronizing with the rising of the system clock SCLK. Q output signals (noninverted output signals) from the flip flops 16A, 16B, 16C are to act as writing authorizing signals RST1, RST2, RST3 for three FIFO memories, respectively. Those FIFO memories corresponding to the writing authorizing signals RST1, RST2, RST3, are named below "first FIFO memory", "second FIFO memory" and "third FIFO memory", respectively (not shown).

Output signals from the flip flops 14A, 14B, 14C are fed back to the OR gates 13A, 13B, 13C, respectively. This is why once a signal at High level is input to the flip flops 14A, 14B, 14C, the Q bar output signals from those flip flops maintain Low level independent of signals input thereto.

On the other hand, the writing authorizing signal MWE is applied from the image processing circuit at the previous stage to the AND gate 15A, the Q output signal from the flip flop 14A is applied to the AND gate 15B, and the Q output signal from the flip flop 14B is applied to the AND gate 15C. The writing authorizing signal MWE is applied to clear input terminals of the counter 11 and the flip flops 14A, 14B, 14C, 16A, 16B and 16C. They are all maintain clear status for a period when the writing authorizing signal MWE is Low.

FIG. 10 is a timing chart illustrating operation of the memory control circuit. When the writing authorizing signal MWE rises at time t1, the output of the AND gate 15A turns to High while the clear status of the flip flops 14A, 14B, 14C, 16A, 16B and 16C is canceled. When the system clock SCLK rises at time t2, output from the AND gate 15A is latched by the flip flop 16A, and consequently, the writing authorizing signal RST1, corresponding to the first FIFO memory turns to High. This allows the first FIFO memory to receive image data in series from the image processing circuit at the previous stage, synchronizing with the system clock SCLK.

At time t1 the clear status of the counter 11 is also canceled, the system clock SCLK is counted for a period from time t2. When a counting value by the counter 11 coincide with the reference value "4,998" in the comparator 12A, the output from the comparator 12A is inverted from Low to High. Then, once output delivered from the comparator 12A through the OR gate 13A is latched by the flip flop 14A in accordance with the following 4999th system clock SCLK, the Q output from the flip flop 14A becomes High while its Q bar output becomes Low. In this state, the output from the AND gate 15A turns to Low, while the output from the AND gate 15B turns to High. Thus, in accordance with the following 5,000th system clocks SCLK, the Q output from the flip flop 16A is inverted to Low, while the Q output from the flip flop 16B is inverted to High.

In this way, at time t3, 5,000 times input of the system clock SCLK after time t1, the writing authorizing signal RST1 corresponding to the first FIFO memory is inverted to Low, and the writing authorizing signal RST2 corresponding to the second FIFO memory is inverted to High. As a result, instead of the writing in the first FIFO memory, writing in the second FIFO memory is started.

With a similar procedure, at time t4 10,000 times input of the system clock SCLK on and after time t1, the writing authorizing signal RST2 corresponding to the second FIFO memory is inverted to Low, and the writing authorizing signal RST3 corresponding to the third FIFO memory is inverted to High. Thus, writing image data in the third FIFO memory is started. At time t5 15,000 times input of the system clock SCLK after time t1 (or when the writing authorizing signal MWE falls), the writing authorizing signal RST3 is inverted to Low, and thus, writing a single line of image data is completed.

After that, at time t6 a period corresponding to one cycle for processing a single line of image data (e.g., 15,240 clocks) after time t1, the writing authorizing signal MWE rises again, and the operation described above is again performed.

Reading image data from the line memory can be effected with a structure similar to the above, and in this case, the reading authorizing signal MRE may be substituted for the writing authorizing signal MWE.

In the above-mentioned structure, each line memory interposed between each pair of the image processing circuits needs a memory control circuit 5 for controlling writing of image data. Specifically, in the structure shown in FIG. 6, for example, a couple of the memory control circuits 5 are needed to control writing image data in the line memories 3 and 4, and additionally, a further memory control circuit is needed to commonly control reading image data from the line memories 3 and 4. Each line memory needs the memory control circuit 5 to write image data in each line memory because a rising timing of the writing authorizing signal MWE input to each line memory from the image processing circuit at the previous stage varies from one image processing circuit to another. In other words, it is necessary to control FIFO memories constituting each line memory with different timings. With many memory control circuits 5 being used as in the above, however, the device structure is complicated and causes an increase in manufacturing cost.

Moreover, each memory control circuit 5 must have a counter 11 which can count a large value corresponding to the A0 size. A circuit structure of the counter 11 is complicated and the cost is high, thereby making the device structure complicated and the intended device cost more.

SUMMARY OF THE INVENTION

Accordingly, it is an object of the present invention to provide a memory control device which overcomes the above-mentioned technological disadvantage, which can control a memory comprised of a plurality of FIFO memories in a simple structure, and which can be manufactured at reduced cost.

In order to attain the above object, according to the present invention, in a memory control device for controlling writing and reading data in and from a memory comprised of a plurality of FIFO memories, writing clocks are generated to circularly write data in the FIFO memories based upon a reference clock for data transfer, and reading clocks are generated to circularly read data from the FIFO memories based upon the reference clock.

With such a structure, data is circularly written in the FIFO memories in accordance with the writing clocks. Thus, data stored in each FIFO memory is discrete. The data stored in the FIFO memories are circularly read in accordance with the reading clocks, and this allows the data to be sequentially read in such order as they are input.

In this way, controlling writing and reading in and from a plurality of FIFO memories, a memory comprised of the FIFO memories can be well controlled without any complicated structure, including a counter, unlike the prior art.

These and other objects, features and effects of the present invention will become more apparent from the following detailed description if taken in conjunction with the accompanying drawings.

Figure 1:
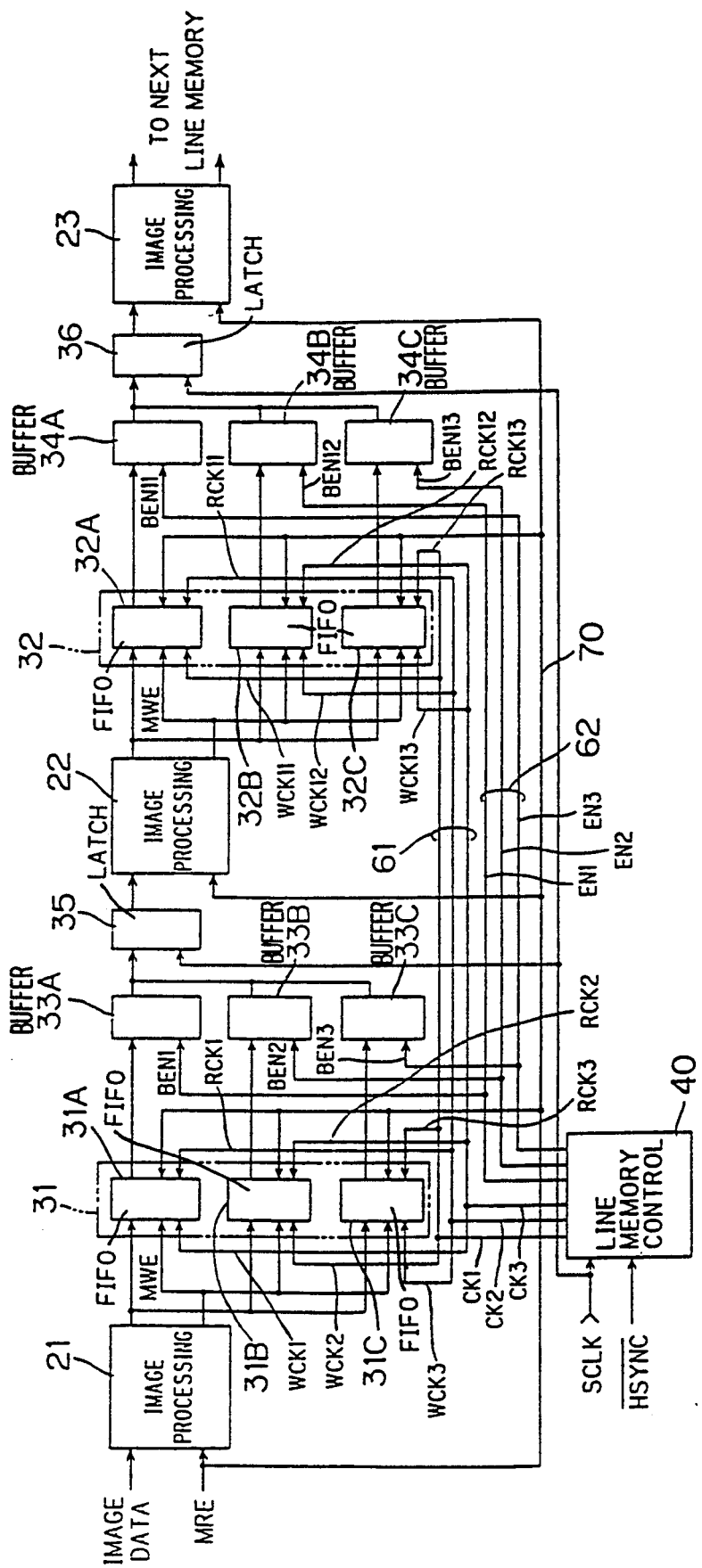
FIG. 1 is a block diagram showing a basic structure of an image data processor to which a memory control device of a preferred embodiment of the present invention is applied.

Although an overline added to symbols designating signals and the like in the drawings represents that those signals are in a status of negative logic, the overline is omitted in this specification.

DESCRIPTION OF THE PREFERRED EMBODIMENTS

FIG. 1 is a block diagram showing an architecture of part of an image data processor to which a memory control device of an embodiment according to the present invention is applied. The image data processor, which, for example, is applied to a digital copying machine, conducts image processing such as emphasizing, inverting, and so forth, to each line of unit data corresponding to a single scanning line of image data produced by an image scanner which optically scans an original sheet. Such image processing operations are carried out by image processing circuits 21, 22 and 23, all of which are functional circuits. A line memory 31, acting as storage means, is placed between the image processing circuit 21 and 22, and a line memory 32, acting as storage means, is placed between the image processing circuits 22 and 23. In this embodiment, focusing upon the line memory 31, the image processing circuit 21 corresponds to a first functional circuit, and the image processing circuit 22 corresponds to a second functional circuit. Also, focusing upon the line memory 32, the image processing circuit 22 corresponds to the first functional circuit, and the image processing circuit 23 corresponds to the second functional circuit.

The image processing circuits 21, 22 and 23 are reset in accordance with a horizontal synchronizing signal HSYNC mentioned below, and then, they process a single line of image data in a specified manner within a single cycle of the horizontal synchronizing signal HSYNC. Furthermore, they take the single line of image data in from the line memories 31, 32 in their respective front stages at a fixed timing to the horizontal synchronizing signal HSYNC while they save the single line of image data in the line memories 31 and 32 in their respective rear stages for a period of time they are reset in accordance with the horizontal synchronizing signal HSYNC.

Each of the line memories 31 and 32 includes three FIFO (First In First Out) memories; namely, 31A, 31B and 31C; and 32A, 32B and 32C, respectively. For example, in the case of a copying machine capable of copying an original sheet of A0 size at maximum, the line memories 31 and 32 require a storage capacity corresponding to the number of dots at a longitudinal side of an A1 size sheet; e.g., about 15,000 dots of image data storage capacity is required. In this case, as each of the FIFO memories 31A, 31B, and 31C; 32A, 32B and 32C, that which can store about 5,000 dots of image data is used.

A reading authorizing signal MRE for authorizing data stored in the line memories 31 and 32 to be read out is set at a fixed timing to the above-mentioned horizontal synchronizing signal HSYNC, and the reading authorizing signal MRE is applied through a line 70 commonly to all the FIFO memories 31A, 31B, 31C; 32A, 32B, 32C constituting the line memories 31 and 32, respectively. The reading authorizing signal MRE is also applied commonly to the image processing circuits 21, 22 and 23, and the image processing circuits 21, 22 and 23 employ the reading authorizing signal MRE as a reference signal to produce a writing authorizing signal MWE which rises at a timing corresponding to a processing time in each circuit. The writing authorizing signal MWE is applied commonly to the FIFO memories 31A, 31B, 31C; 32A, 32B, 32C constituting the line memories 31 and 32 in the subsequent stages to the image processing circuits 21, 22 and 23.

Clocks CK1, CK2 and CK3 for determining the timing for writing or reading data in or from the line memories 31 and 32 are generated in a line memory control circuit 40. The clocks CK1, CK2 and CK3 permit the FIFO memories 31A, 31B, 31C; 32A, 32B, 32C constituting the line memories 31 and 32 to circularly write or read data. In the line memory control circuit 40, the clocks CK1, CK2 and CK3, as mentioned above, are produced based upon a system clock SCLK for determining the timing for image data transfer and the above-mentioned horizontal synchronizing signal HSYNC corresponding to scanning by the image scanner in a primary scanning direction.

After data from the FIFO memories 31A, 31B, 31C; 32A, 32B, 32C are once stored in buffers 33A, 33B, 33C; 34A, 34B, 34C, they are circularly applied to latch circuits 35 and 36 and retained therein so as to apply to the image processing circuits 22 and 23 in their subsequent stages. In the line memory control circuit 40, output authorizing signals EN1, EN2 and EN3 for authorizing the above-mentioned buffers 33A, 33B, 33C; 34A, 34B, 34C to circularly output are produced. The latch circuits 35 and 36 retain image data from the buffer 33A, 33B, 33C; 34A, 34B, 34C based upon the system clock SCLK.

Figure 2:
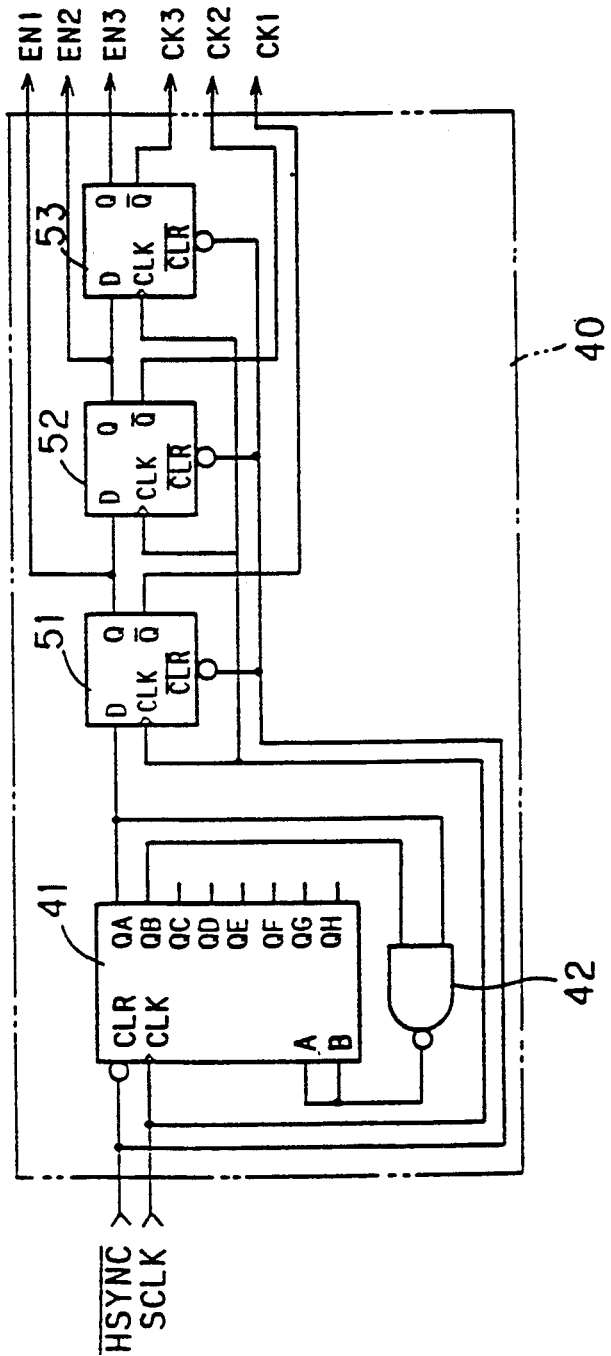
FIG. 2 is a block diagram showing an exemplary arrangement of a line memory control circuit.

FIG. 2 is a block diagram showing an exemplary architecture of the line memory control circuit 40. The line memory control circuit 40 has a parallel output shift register 41, for performing a shift operation based upon the system clock SCLK, and flip flops 51, 52 and 53 for delaying the output signal of the first stage of the shift register 41 by a single clock in order. Then, the Q bar outputs (inverting output signals) from the flip flops 51, 52 and 53 are the clocks CK1, CK2 and CK3 used commonly for writing and reading image data. The Q outputs (noninverting output signal) are the output authorizing signals EN1, EN2 and EN3 for authorizing the buffers 33A, 33B, 33C; 34A, 34B, 34C to output.

Signals from output terminals QA and QB, from the first and second stages of the shift register 41 respectively, are applied to a NAND gate 42, and an output signal from the NAND gate 42 is applied to input terminals A and B of the shift register 41. The shift register 41, and clear input terminals of the flip flops 51, 52 and 53 receive a reference signal HSYNC, and they are retained in a clear state when the reference signal is at Low level.

Table 1 below is a function table for the shift register 41. In the Table 1, "H" represents High level while "L" represents Low level. " ↑ " represents rising of a signal, and "X" represents that either state of High level and Low level may be presented. "QA0, QB0" represents a state where data is held, and "QAn, QBn" represents data shifted from the previous stage.

As will be recognized from the Table 1, when a signal at Low level is applied to a clear input terminal CLR to keep the shift register 41 in a clear state, any of output terminals QA, QB, ..., QH at respective stages holds a signal at Low level. Synchronizing with rising of a signal input to a clock input terminal CLK, the shift register 41 performs shift operations. At this time, when at least one of signals input to the input terminals A and B is at Low level, the output terminal QA at the first stage holds a signal at Low level. The output terminal QA at the first stage holds a signal at High level only when signals at High level are applied to both the input terminals A and B.

TABLE 1

| INPUT | | | | OUTPUT | | | |
|---|---|---|---|---|---|---|---|
| CLR | CLK | A | B | QA | QB | QC | ... |
| L | C | X | X | L | L | L | L |
| H | L | X | X | QA0 | QB0 | QC0 | ... |
| H | ↑ | H | H | H | QAn | QBn | ... |
| H | ↑ | L | X | L | QAn | QBn | ... |
| H | ↑ | X | L | L | QAn | QBn | ... |

Figure 3:
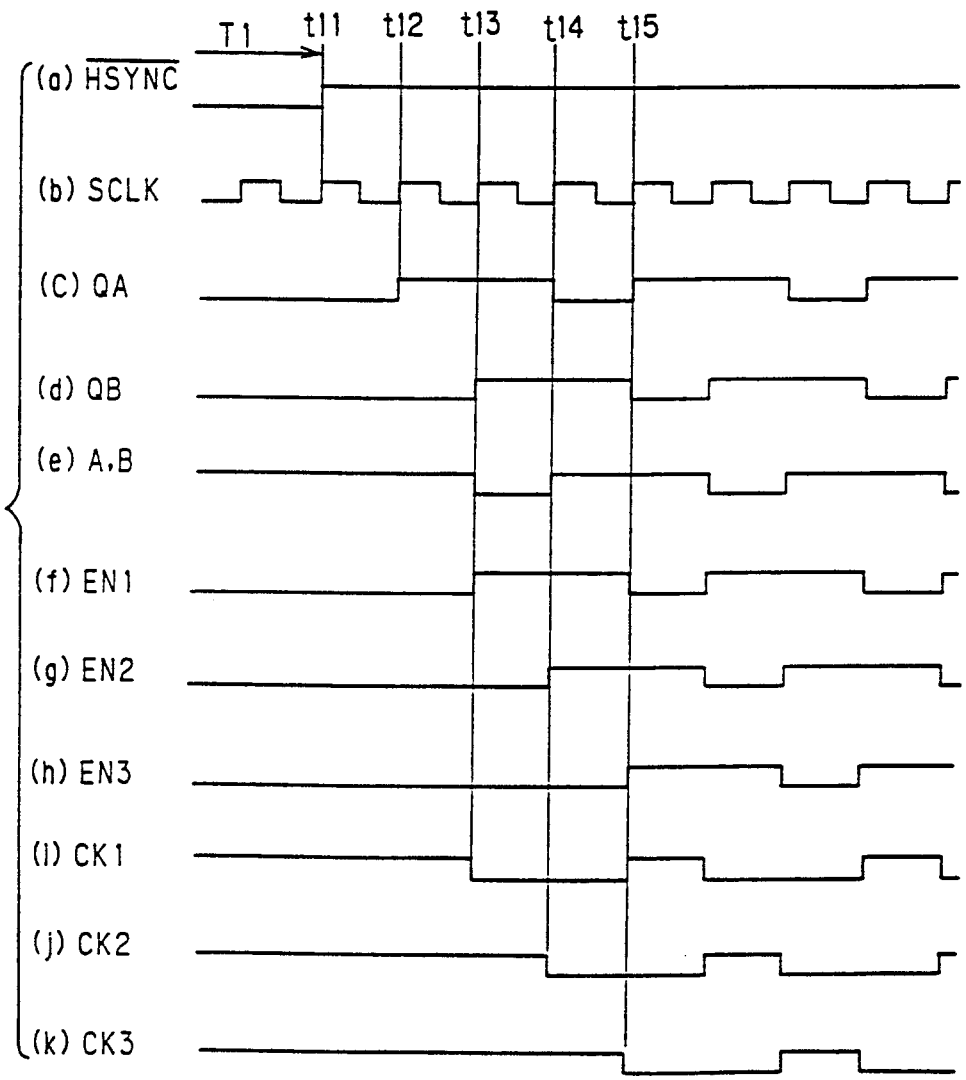
FIG. 3 is a timing chart illustrating operation of the line memory control circuit.

FIG. 3 is a timing chart illustrating operation of the line memory control circuit 40. For a period T1, the reference signal HSYNC is at Low level, and the shift register 41 and the flip flops 51, 52 and 53 maintain clear state. Thus, the output terminals QA, QB, ..., QH at respective stages in the shift register 41 hold signals at Low level, and this results in the data input terminals A and B receiving signals at High level from the NAND gate 42. The flip flops 51, 52 and 53 have their respective Q outputs (writing authorizing signals EN1, EN2 and EN3) turned to Low and their respective Q bar outputs (clocks CK1, CK2 and CK3) turned to High.

Once the reference signal HSYNC rises at time t11, input signals at the data input terminals A and B are all turned to High at time T12 when a system clock SCLK first rises after time t11, and therefore, the output terminal QA at the first stage of the shift register 41 outputs a signal at High level while the output terminal QB at the second stage outputs the signal at Low level which the first stage held till then. Thus, the NAND gate 42 receives a signal at High level and a signal at Low level, and eventually, the signals input to the data input terminals A and B maintain High level.

When the next clock is applied at time T13, the signals at High level input to the data input terminals A and B cause the output terminal QA at the first stage to output a signal at High level and the output terminal QB at the second stage to output the signal at High level which the first stage held till then. Thus, the NAND gate 42 has its output inverted to Low.

Moreover, when the next clock is applied at time T14, the first stage of the shift register 41 holds outputs at Low level from the data input terminals A and B, and the second stage receives the signal at High level from the first stage. As a result, the NAND gate 42 has its output inverted to High, and therefore, at time t15 when the next clock is applied, the output terminal QA at the first stage of the shift register 41 outputs a signal at High level, and the output terminal QB at the second stage outputs the signal at Low level shifted from the first stage.

Operations of the shift register 41 subsequent to time T15 are the repetitions of the operations from time T11 to time T15.

The signal output by the output terminal QA at the first stage of the shift register is delayed by a single clock in the flip flop 51 to turn to the output authorizing signal EN1 as shown in FIG. 3(f), which, in turn, is delayed by a single clock in the flip flop 52 to turn to the output authorizing signal EN2 as shown in FIG. 3(g), which, in turn, is delayed by a single clock in the flip flop 53 to turn to the output authorizing signal EN3 as shown in FIG. 3(h). Also, as shown in FIGS. 3(i), 3(j) and 3(k), the output authorizing signals EN1, EN2 and EN3 are inverted signals of the clocks CK1, CK2 and CK3, respectively.

Since the clocks CK1, CK2 and CK3, and the output authorizing signal EN1, EN2 and EN3 are generated based upon the horizontal synchronizing signal HSYNC, they all have certain relations with the above-mentioned reading authorizing signal MRE generated based upon the same horizontal synchronizing signal HSYNC, respectively.

Figure 4:
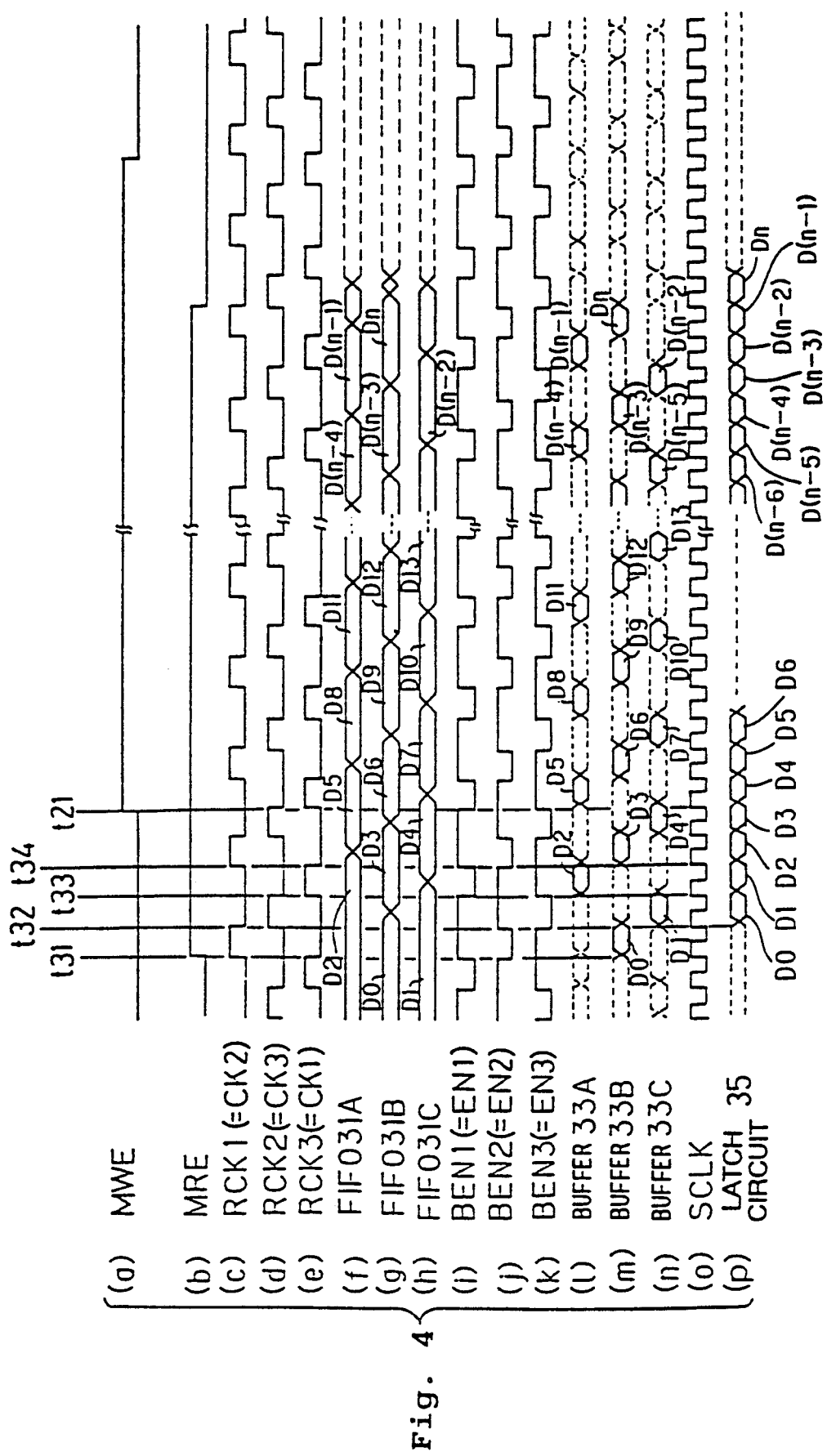
FIG. 4 is a timing chart illustrating an operation of reading image data from a line memory.

FIG. 4 is a timing chart illustrating operations of reading data from the line memory 31. As to the FIFO memories 31A, 31B and 31C constituting the line memory 31, for example, the FIFO memory from which data is first read based upon the reading authorizing signal MRE is defined as the FIFO memory 31B (or the FIFO memory 32B in the line memory 32). Data D0, D1, D2, ..., Dn (where n is 15,000, for example) constituting a single line are circularly written in the FIFO memories 31A, 31B and 31C so that the first data D0 is written in the FIFO memory 31B. In the FIFO memory 31A, for example, data D2, D5, D8, ..., D(n−1) are written in order; in the FIFO memory 31B data D0, D3, D6, ..., Dn are written in order; in the FIFO memory 31C, data D1, D4, D7, ..., D(n−2) are written in order.

The reading authorizing signal MRE, having a certain relation with the horizontal synchronizing signal HSYNC, is applied commonly to the FIFO memories 31A, 31B, 31C; 32A, 32B, 32C of the line memories 31 and 32, respectively.

The clocks CK1, CK2 and CK3 from the line memory control circuit 40 are applied to the line memory 31 so as to act as reading clocks RCK1, RCK2 and RCK3 for the FIFO memories 31A, 31B and 31C. The clocks CK1, CK2, CK3 are related to the reading clocks RCK1, RCK2, RCK3 in the manner that any clock first rising after the reading authorizing signal MRE (the clock CK3 in this embodiment) rises is applied to the FIFO memory 31B where the first image data D0 is written. Thus, the relations between the clocks CK1, CK2, CK3 and the reading clocks RCK1, RCK2, RCK3 are expressed as follows:

RCK1=CK2
RCK2=CK3
RCK3=CK1

The relations between reading authorizing signals RCK11, RCK12, RCK13 for the FIFO memories 32A, 32B and 32C constituting the line memory 32 and the clock signals CK1, CK2, CK3 are similar to those in the line memory 31 and are expressed as follows:

RCK11=CK2 (=RCK1)
RCK12=CK3 (=RCK2)
RCK13=CK1 (=RCK3)

The output authorizing signals EN1, EN2 and EN3 from the line memory control circuit 40 are applied to the buffers 33A, 33B and 33C as output authorizing signals BEN1, BEN2 and BEN3 for those buffers. The output authorizing signals EN1, EN2, EN3 are related to the output authorizing signals BEN1, BEN2, BEN3 in the manner that any output authorizing signal first turning Low after the reading authorizing signal MRE rises (the output authorizing signal EN2 in this embodiment) is applied to the buffer 33B corresponding to the FIFO memory 31B where the first image data D0 is written. Thus, the relations between the output authorizing signals BEN1, BEN2, BEN3 corresponding to the FIFO memories 31A, 31B, 31C respectively and the output authorizing signals EN1, EN2, EN3 received from the line memory control circuit 40 are expressed as follows:

BEN1=EN1
BEN2=EN2
BEN3=EN3

Each of the buffers 33A, 33B and 33C, when receiving a signal at Low level, outputs data it holds.

The relations between the output authorizing signals BEN11, BEN12, BEN13 for the buffers 34A, 34B and 34C of the line memory 32 and the output authorizing signals EN1, EN2, EN3 are similar to those in the line memory 31 and expressed as follows:

BEN11=EN1 (=BEN1)
BEN12=EN2 (=BEN2)
BEN13=EN3 (=BEN3)

For a period previous to time t31 when the reading authorizing signal MRE rises, the FIFO memories 31A, 31B and 31C output the respective data D2, D0 and D1 first written therein. Then, synchronizing with the rising of the reading authorizing signal MRE at time t31, the output authorizing signal BEN2 for the buffer 33B is inverted to Low so that the output data of the buffer 33B turns to D0. At time t32, synchronizing with the rising of the system clock SCLK, the output data D0 of the buffer 33B is latched by the latch circuit 35 and then applied to the image processing circuit 22.

At time t32, the reading clock RCK 12 for the FIFO memory 31B rises, thereby to turn data read from the FIFO memory 31B into the next image data D3. Furthermore, at time t32, the output authorizing signal BEN 3 for the buffer 33C is inverted to Low, so that on and after time t32 the data D1 first input to the FIFO memory 31C is received from the buffer 33C.

At time t33 when the next clock is applied, the data D1 from the buffer 33C is latched by the latch circuit 35, and data to be output from the FIFO memory 31C turns to the next data D4, synchronizing with the rising of the reading clock RCK3 for the FIFO memory 31C. The output authorizing signal BEN1 for the buffer 33A is inverted to Low, and the data D2 first input to the FIFO memory 31A is received from the buffer 33A.

Responsive to rising of the next system clock SCLK at time t34, the data D2 is applied through the latch circuit 35 to the image processing circuit 22. Also at time t34, the reading clock RCK1 for the FIFO memory 31A rises, and this causes data to be output from the FIFO memory 31A to turn to the next image data D5.

Operations after time t34 are the repetitions of the operations from time t31 to time t34, which permit image data to be applied to the image processing circuit 22 in right order like D0, D1, D2, D3, and so forth, each time the system clock SCLK rises.

In FIG. 4, parallel broken lines represent part where data is indefinite.

For example, in the case where the image processing circuit 22 requires four clocks for processing data therein, the image processing circuit 22 has a writing authorizing signal MWE rise at time t21 five clocks after time t31 when the reading authorizing signal MRE rises, including one clock required for the data saving operation at the latch circuit 35, so as to make the FIFO memories 32A, 32B, 32C of the next line memory 32 available for writing.

Figure 5:
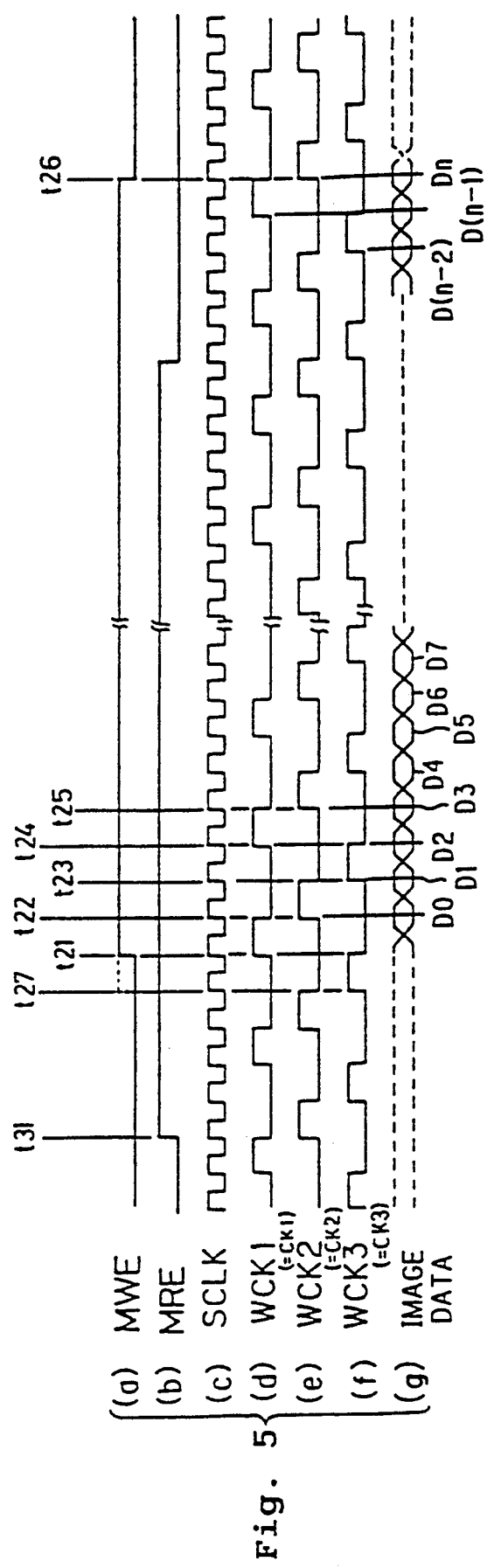
FIG. 5 is a timing chart illustrating an operation of writing image data in the line memory.
Figure 6:
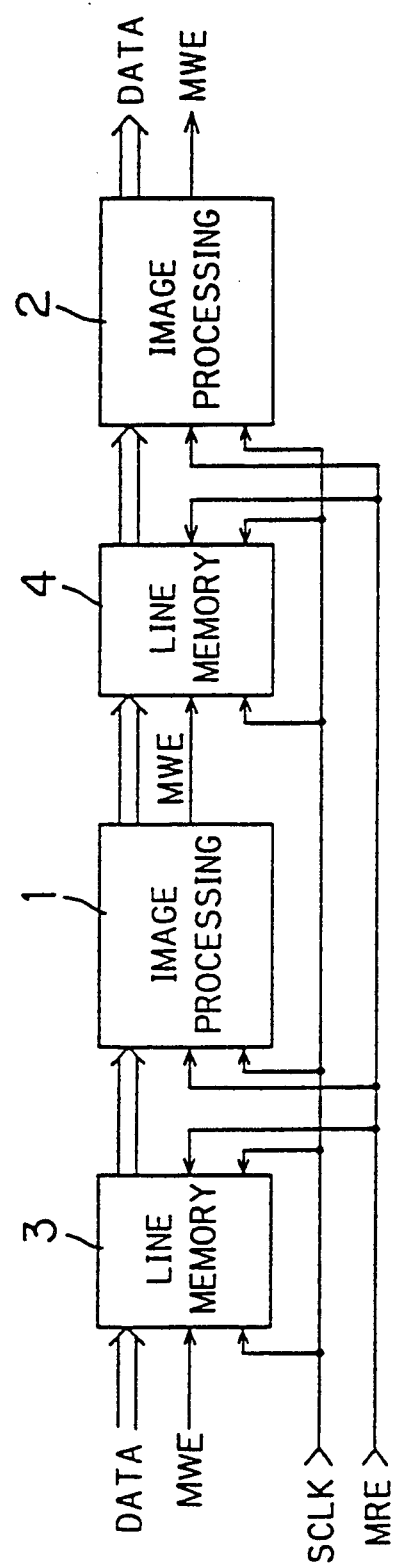
FIG. 6 is a block diagram showing a basic structure of an image data processor where a line memory is interposed between each pair of image processing circuits.
Figure 7:
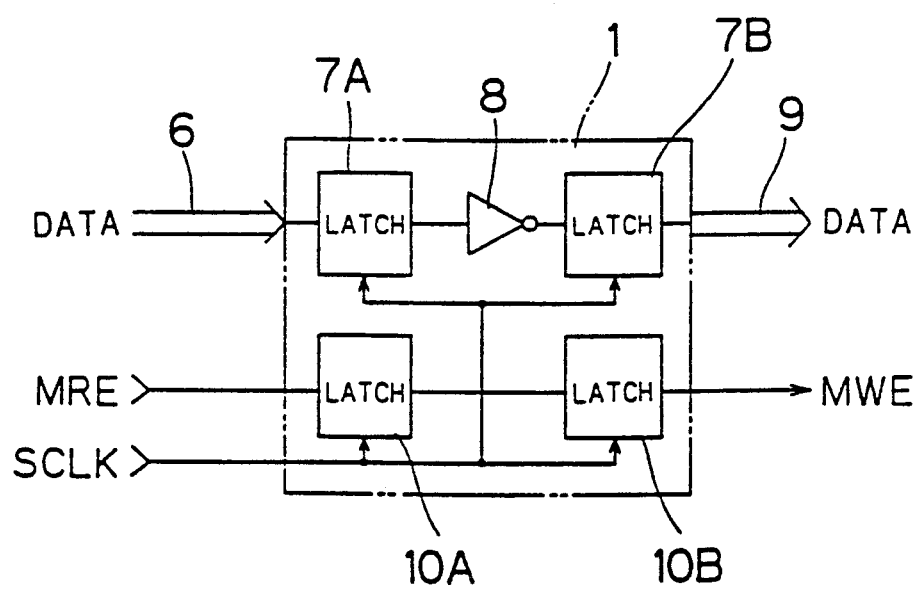
FIG. 7 is a block diagram showing an exemplary arrangement of an image processing circuit for black and white inversion.
Figure 8:
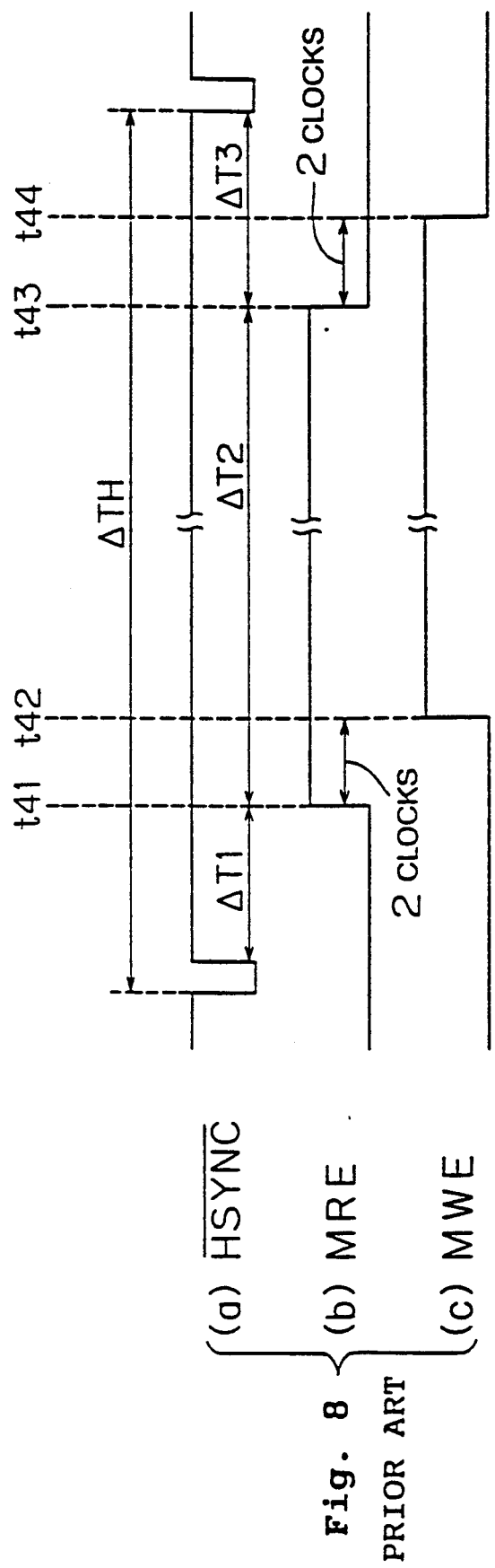
FIG. 8 is a timing chart illustrating operation of the image data processor shown in FIG. 6.
Figure 9:
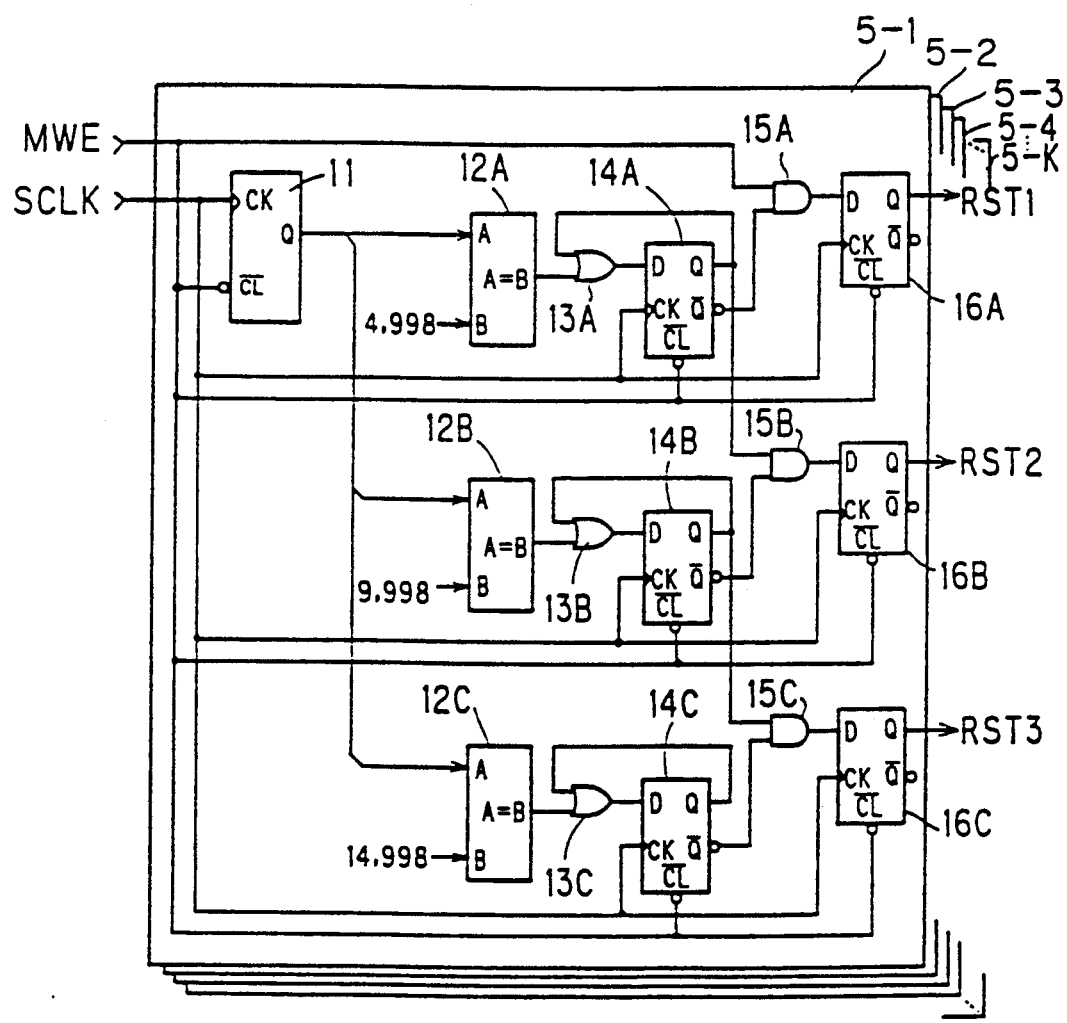
FIG. 9 is a block diagram showing a structure of a prior art memory control device.
Figure 10:
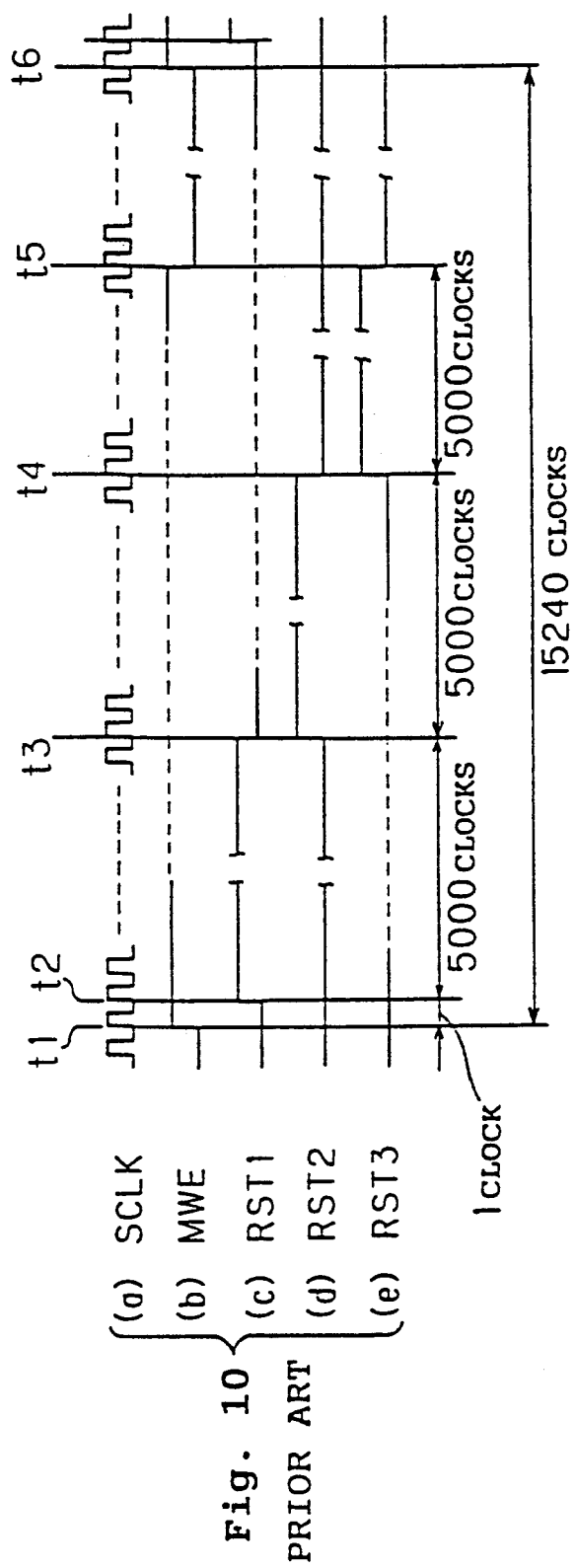
FIG. 10 is a timing chart illustrating operation of the prior art memory control device.

FIG. 5 is a timing chart illustrating the operation of writing data in the line memory 32 in the subsequent stage of the image processing circuit 22. For simplification of the explanation, data processed in the image processing circuit 22 are represented by like reference numerals corresponding to the data D0, D1, D2, . . . input to the image processing circuit 22.

After the image processing circuit 21 makes the writing authorizing signal MWE rise, the image data D0, D1, D2 are received in order from the image processing circuit 21. In FIG. 5(g), parallel broken lines represent part where data is indefinite.

On the other hand, the above mentioned clocks CK1, CK2, CK3 from the line memory control circuit 40 are applied to the line memory 32 as writing clocks WCK11, WCK12, WCK13 for the FIFO memories 32A, 32B and 32C. In this case, however, the clocks CK1, CK2, CK3 are related to the writing clocks WCK11, WCK12, WCK13 in the manner that any clock first rising after the rising of the writing authorizing signal MWE is applied to the line memory 32B from which the image data is first read. In this embodiment, as can be seen in FIG. 4, the clock CK2 of the clocks CK1, CK2 and CK3 first rises after the rising of the writing authorizing signal MWE. Thus, the relations between the writing clocks WCK11, WCK12, WCK13 and the clocks CK1, CK2, CK3 are specified as follows:

WCK11=CK1 (=RCK13=RCK3)
WCK12=CK2 (=RCK11=RCK1)
WCK13=CK3 (=RCK12=RCK2)

At time t22 when the system clock SCLK first rises after the writing authorizing signal MWE rises at time t21, the writing clock WCK12 for the FIFO memory 32B rises. Hence, the first image data D0 is written in the FIFO memory 32B.

At time t23 one clock after time t22, the writing clock WCK13 rises, and accordingly the second image data D1 is written in the FIFO memory 32C. At time t24 one clock after time t23, the writing clock WCK11 rises, and accordingly the third image data D2 is stored in the FIFO memory 32A.

For a period subsequent to time t25, similar operations to those from time t22 to time t25 are performed. As a result, image data D2, D5, D8, and so forth are stored in the FIFO memory 32A, data D0, D3, D6, and so forth are stored in the FIFO memory 32B, and image data D1, D4, D7, and so forth are stored in the FIFO memory 32C.

At time t26 after n of image data corresponding to a single line are output, the image processing circuit 22 inverts the writing authorizing signal MWE into Low.

As shown in FIG. 1, the line memories 31 and 32 are different from each other in the relations between the writing clocks WCK1, WCK2, WCK3; WCK11, WCK12, WCK13 and the clocks CK1, CK2 and CK3 to the FIFO memories 31A, 31B, 31C; 32A, 32B, 32C, because the number of clocks required for data processing operation by the image processing circuit 21 are different from the number of clocks required for data processing operation by the image processing circuit 22.

For example, assuming that the image processing circuit 21 requires three clocks for its processing and that the timing chart of FIG. 5 is used for illustrating the data writing from the image processing circuit 21 to the line memory 31, the image processing circuit 21 permits the writing authorizing signal MWE to rise at time t27 four clocks after time t31 (three clocks+one clock in the latch circuit at the previous stage), as represented by broken line in FIG. 5(a). The first data can be written in the FIFO memory 31B by applying the clock CK1 first rising after the rising of the writing authorizing signal MWE to the FIFO memory 31B where the image data is read first. Thus, the relations between the writing clocks WCK1, WCK2, WCK3 and the clocks CK1, CK2, CK3 to the FIFO memories 31A, 31B and 31C may be selected as follows:
WCK1=CK3 (=WCK13=RCK12=RCK2)
WCK2=CK1 (=WCK11=RCK13=RCK3)
WCK3=CK2 (=WCK12=RCK11=RCK1)

In this way, arrangements where signal lines 61 and 62 through which the clocks CK1, CK2, CK3 and the output authorizing signals EN1, EN2, EN3 are delivered are connected to the FIFO memories 31A, 31B, 31C; 32A, 32B, 32C and the buffers 33A, 33B, 33C; 34A, 34B, 34C are adequately designed separately for the line memories 31 and 32. This allows writing and reading in and from the line memories 31 and 32 to be well controlled although the clocks CK1, CK2, CK3 and the output authorizing signals EN1, EN2, EN3 are applied from the common line memory control circuit 40 to the different line memories 31, 32 and the like. The same may be said of the case where there are many more line memories, and the single line memory control circuit 40 can perfectly control any number of line memories. Specifically, in each image processing circuit, after image data is read with specified timing related to the horizontal synchronizing signal HSYNC, a single line of data can be saved in its previous and subsequent line memories for a period when the image processing circuit is reset by the horizontal synchronizing signal HSYNC.

As has been described, in the memory control device according to the present embodiment, the single line memory control circuit 40 can be commonly used for a plurality of line memories different in timing of writing from each other, and it is unnecessary to provide each line memory with its own control circuit. This results in an extremely simplified structure of the memory control device, and its manufacturing cost can be considerably reduced.

In addition to that, even if a plurality of line memories are used, substantially required lines are simply six signal lines 61 and 62 extending from the line memory control circuit 40 for delivering writing clocks and reading clocks to the FIFO memories of each line memory and signal lines for connecting the six signal lines 61, 62 to the FIFO memories of each line memory. With a structure in which each line memory requires its own control circuit as in the prior art, signal lines for connecting control circuits and FIFO memories of each line memory are required for each line memory, a considerably large number of signal lines are required if many line memories are provided. Thus, there arises the problem that a larger substrate area is required in the prior art, while there is no such problem with the above-mentioned structure in this embodiment.

Moreover, if the control apparatus for the plurality of line memories is constructed as an ASIC (Application Specific Integrated Circuit), the number of required pins can be greatly reduced, compared with the structure in the prior art where each line memory requires its own control circuit. Thus, a package of the ASIC can be downsized so that the size of the substrate area of the image processing apparatus can be smaller.

The line memory control circuit 40 may generate the clocks CK1, CK2, CK3 for circularly writing and reading in and from the three FIFO memories and may generate the output authorizing signals EN1, EN2, EN3 for authorizing the groups of three buffers 33A, 33B, 33C; 34A, 34B, 34C to circularly output, so that a counter capable of counting a large number is needless. In other words, a simple and low cost circuit structure, including the shift register 41, the flip flops 51, 52, 53 and the like, can implement such a function.

When each line memory must be comprised of four or more FIFO memories since a single line includes a large number of data, for example, a clock for reading or writing in four-clock cycles may be generated so as to circularly select four FIFO memories, and even in such a case, the circuit structure is not excessively complicated. Thus, this embodiment can easily cope with a variation in the number of data in a single line. It is not intended that the present invention be limited to the above mentioned embodiment. For example, since the FIFO memories 31A, 31B, 31C; 32A, 32B, 32C are not controllable to asynchronously output in the above-mentioned embodiment according to the present invention, the buffers 33A, 33B, 33C; 34A, 34B, 34C are employed to prevent a collision of output from those FIFO memories. However, if FIFO memories which are controllable to provide a synchronous output are employed, those buffers may be omitted.

Although, in the embodiment above, the clocks CK1, CK2, CK3 output from the line memory control circuit 40 act as both writing clocks and reading clocks, the writing clocks and reading clocks may be generated by each individual structure.

Also, in the above embodiment, although there has been described a case where the common reading authorizing signal MRE is by to the line memories 31 and 32 to read data from a plurality of line memories with a common timing, the reading authorizing signal may vary from one line memory to another. In this case, however, the relations between the writing clocks and the reading clocks are organized so that data is first written in any FIFO memory where data is first read.

Also, although image processing in a digital copying machine is illustrated in the above-mentioned embodiment, the present invention can also be applied to image data processing in other types of image processing apparatus, such as a facsimile apparatus. Moreover, the data processed should not be limited to image data. The present invention can also be applied any structure where a plurality of function circuits are to sequentially process data transferred in series, and a storage means comprised of a plurality of FIFO memories is interposed between any pair of the function circuits.

While there have been illustrated and described preferred embodiments of the present invention, the foregoing description is for the purpose of simply setting forth the technological subject matter of the invention and is not to be considered as limiting or restricting the invention to the embodiments above, and the appended claims alone cover the true spirit and scope of the invention.

What is claimed is:

1. A memory control device for controlling writing and reading of data in and from storage means including a plurality of FIFO memories, said storage means being interposed between a first function circuit and a second function circuit and capable of storing data transferred between the first and second function circuits, said memory control device comprising:
    writing clock generating means for generating a writing clock for writing data in the storage means based upon a specified reference clock, the reference clock being a clock for data transfer;
    means for applying the writing clock generated by said writing clock generating means to the plurality of FIFO memories so as to circularly write data in the plurality of FIFO memories;
    reading clock generating means for generating a reading clock for reading data from the storage means based upon the specified reference clock;
    means for applying the reading clock generated by said reading clock generating means to the plurality of FIFO memories so as to circularly read data from the plurality of FIFO memories;
    means for applying a writing authorizing signal commonly to the plurality of FIFO memories so as to authorize the plurality of FIFO memories to write data;
    means for applying a reading authorizing signal commonly to the plurality of FIFO memories so as to authorize the plurality of FIFO memories to read data; and
    means for organizing the relations between the reading clock and the writing clock so that in response to the writing authorizing signal the first data is written in any FIFO memory where the data is first read in response to the reading authorizing signal.

2. The memory control device according to claim 1 wherein the storage means is a line memory having a capacity sufficient to store a single line of image data corresponding to a single scanning line in optically scanning and reading an original sheet.

3. The memory control device according to claim 2 wherein the first and second function circuits perform specified image processing functions, respectively.

4. A memory control device according to claim 3, wherein the first function circuit is reset at specified time intervals in accordance with a specified reset signal and saves data in the storage means for a period when the first function circuit is reset.

5. The memory control device according to claim 4, wherein the reading authorizing signal is output at a specified timing related to the reset signal.

6. The memory control device according to claim 5, further comprising:
    writing signal generating means for delaying the reading authorizing signal by a time corresponding to time spent for data processing by the first function circuit so as to output the delayed signal as a writing signal to the storage means.

7. A memory control device for controlling writing and reading of data in and from storage means including a plurality of FIFO memories, said memory control device comprising:
    writing clock generating means for generating writing clocks for writing data in the storage means based upon a specified reference clock, said writing clock generating means including means for generating writing clocks different in timing from each other and equivalent in number to the number of FIFO memories constituting the storage means;
    means for allocating and applying the writing clocks generated by said writing clock generating means to the plurality of FIFO memories so as to circularly write data in the plurality of FIFO memories;
    reading clock generating means for generating a reading clock for reading data from the storage means based upon the specified reference clock; and
    means for applying the reading clock generated by said reading clock generating means to the plurality of FIFO memories so as to circularly read data from the plurality of FIFO memories.

8. A memory control device for controlling writing and reading of data in and from storage means including a plurality of FIFO memories, said memory control device comprising:
    writing clock generating means for generating a writing clock for writing data in the storage means based upon a specified reference clock;
    means for applying the writing clock generated by said writing clock generating means to the plurality of FIFO memories so as to circularly write data in the plurality of FIFO memories;
    reading clock generating means for generating reading clocks for reading data from the storage means based upon the specified reference clock, said reading clock generating means including means for generating reading clocks different in timing from each other and equivalent in number to the number of FIFO memories constituting the storage means; and
    means for allocating and applying the reading clocks generated by said reading clock generating means to the plurality of FIFO memories so as to circularly read data from the plurality of FIFO memories.

9. A memory control device for controlling writing and reading of data in and from storage means including a plurality of FIFO memories, said memory control device comprising:
    writing clock generating means for generating a writing clock for writing data in the storage means based upon a specified reference clock;
    means for applying the writing clock generated by said writing clock generating means to the plurality of FIFO memories so as to circularly write data in the plurality of FIFO memories;
    reading clock generating means for generating a reading clock for reading data from the storage means based upon the specified reference clock;
    means for applying the reading clock generated by said reading clock generating means to the plurality of FIFO memories so as to circularly read data from the plurality of FIFO memories; and
    a common clock generating means shared by said writing clock generating means and said reading clock generating means, said common clock generating means generating a plurality of clocks different in timing from each other and equivalent in number to the number of FIFO memories constituting the storage means.

10. The memory control device according to claim 9, wherein:
the storage means includes three FIFO memories;
said common clock generating means includes:
(a) a shift register of parallel output type having a plurality of stages and a data input terminal for shifting data among stages based upon the reference clock, an output signal from a first stage turning to a specified logic status when the data input terminal turns to a specified logic status;
(b) an AND circuit receiving output signals from first and second stages of said shift register and having its output applied to the data input terminal of said shift register;
(c) first latch means for latching the output signal from the first stage of said shift register based upon the reference clock;
(d) second latch means for latching the output from the first latch means based upon the reference clock; and
(e) third latch means for latching the output from the second latch means based upon the reference clock; and
said memory control device further comprises means allocating and applying signals corresponding to the output signals from the first, second and third latch means as writing clocks to the three FIFO memories, and means allocating and applying signals corresponding to the output signals from the first, second and third latch means as reading clocks to the three FIFO memories.

11. A memory control device for controlling writing and reading of data in and from storage means including a plurality of FIFO memories, said storage means being interposed between a first function circuit and a second function circuit and capable of storing data transferred between the first and second function circuits, said memory control device comprising:
writing clock generating means for generating writing clocks different in timing from each other and equivalent in number to the number of FIFO memories constituting the storage means, based upon a specified reference clock;
means for allocating and applying the plurality of writing clocks generated by said writing clock generating means to the plurality of FIFO memories so as to circularly write data in the plurality of FIFO memories;
reading clock generating means for generating reading clocks different in timing from each other and equivalent in number to the number of FIFO memories constituting the storage means, based upon said reference clock;
means for allocating and applying the plurality of reading clocks generated by said reading clock generating means to the plurality of FIFO memories so as to circularly read data from the plurality of FIFO memories;
means for applying a writing authorizing signal commonly to the plurality of FIFO memories so as to authorize the plurality of FIFO memories to write data;
means for applying a reading authorizing signal commonly to the plurality of FIFO memories so as to authorize the plurality of FIFO memories to read data; and
means for organizing the relations between the reading clocks and the writing clocks so that in response to the writing authorizing signal the first data is written in any FIFO memory where the data is first read in response to the reading authorizing signal.

12. The memory control device according to claim 11, wherein the storage means is a line memory having a capacity sufficient to store a single line of image data corresponding to a single scanning line in optically scanning and reading an original sheet.

13. The memory control device according to claim 12, wherein the first and second function circuits perform respective specified image processing functions.

14. The memory control device according to claim 13, wherein the first function circuit is reset at specified time intervals in accordance with a specified reset signal and saves data in the storage means for a period when the first function circuit is reset.

15. The memory control device according to claim 14 wherein the reading authorizing signal is output at a specified timing related to the reset signal.

16. The memory control device according to claim 15, further comprising:
writing signal generating means for delaying the reading authorizing signal by a time corresponding to time spent for data processing by the first function circuit so as to output the delayed signal as a writing signal to the storage means.

17. A memory control device for controlling writing and reading of data in and from storage means including a plurality of FIFO memories, said memory control device comprising:
writing clock generating means for generating writing clocks different in timing from each other and equivalent in number to the number of FIFO memories constituting the storage means, based upon a specified reference clock;
means for allocating and applying the plurality of writing clocks generated by said writing clock generating means to the plurality of FIFO memories so as to circularly write data in the plurality of FIFO memories;
reading clock generating means for generating reading clocks different in timing from each other and equivalent in number of the number of FIFO memories constituting the storage means, based upon said reference clock;
means for allocating and applying the plurality of reading clocks generated by said reading clock generating means to the plurality of FIFO memories so as to circularly read data from the plurality of FIFO memories; and
a common clock generating means shared by said writing clock generating means and said reading clock generating means, said common clock generating means generating a plurality of clocks different in timing from each other and equivalent in number to the number of FIFO memories constituting the storage means.

18. The memory control according to claim 17, wherein:
the storage means includes three FIFO memories;
said clock generating means includes:
(a) a shift register of parallel output type having a plurality of stages and a data input terminal for shifting data among stages based upon the reference clock, an output signal from a first stage turning to a specified logic status when the data input terminal turns to a specified logic status, (b) an AND circuit receiving output signal from first and second stages of said shift register and having its output applied to the data input terminal of said shift register, (c) first latch means for latching an output signal from the first stage of said shift register based upon the reference clock, (d) second latch means for latching the output from the first latch means based upon the reference clock, and (e) third latch means for latching the output from the second latch means based upon the reference clock;

means allocating and applying signals corresponding to the output signals from the first, second and third latch means as writing clocks to the three FIFO memories; and means allocating and applying signals corresponding to the output signals from the first, second and third latch means as reading clocks to the three FIFO memories.

19. A memory control device for controlling writing and reading of data in and from a plurality of storage means, wherein each storage means is interposed between a pair of function circuits connected in series, and wherein each storage means includes a plurality of FIFO memories, said memory control device comprising:

writing clock generating means for generating a writing clock to be applied commonly to the plurality of storage means based upon a specified reference clock so as to write data in the plurality of storage means;

means for applying the writing clock generated by said writing clock generating means to the plurality of FIFO memories of each storage means so as to circularly write data in the plurality of FIFO memories of each storage means;

reading clock generating means for generating a reading clock to be applied commonly to the plurality of storage means based upon the specified reference clock so as to read stored data from the plurality of storage means; and means for applying the reading clock generated by said reading clock generating means to the plurality of FIFO memories of each storage means so as to circularly read data from the plurality of FIFO memories of each storage means.

20. The memory control device according to claim 19, further comprising means for applying a writing authorizing signal commonly to the plurality of FIFO memories of each storage means to authorize the plurality of FIFO memories to write data;

means for applying a reading authorizing signal commonly to the plurality of FIFO memories of each storage means to authorize the plurality of FIFO memories to read data; and means for organizing the relations between the reading clock and the writing clock in each storage means so that in response to the writing authorizing signal the first data is written in any FIFO memory where data is first read in response to the reading authorizing signal.

21. The memory control device according to claim 20, wherein:

the storage means are capable of storing data transferred between the function circuits; and the reference clock is a clock for data transfer.

22. The memory control device according to claim 21, wherein the plurality of storage means are line memories, each line memory having a capacity sufficient to store a single line of image data corresponding to a single scanning line in optically scanning and reading an original sheet.

23. The memory control device according to claim 22, wherein the plurality of function circuits perform respective specified image processing functions.

24. The memory control device according to claim 23, wherein each of the function circuits is reset at specified time intervals in accordance with a specified reset signal and saves data into the storage means interposed between such function circuit and another function circuit for a period when such function circuit is reset.

25. The memory control device according to claim 24, wherein the reading authorizing signal is output at a specified timing related to the reset signal.

26. The memory control device according to claim 25, further comprising for each function circuit, writing signal generating means for delaying the reading authorizing signal by a time corresponding to time spent for data processing in each function circuit so as to output the delayed signal as a writing signal to the storage means interposed between such function circuit and another function circuit.

27. The memory control device according to claim 19, wherein said writing clock generating means includes means for generating writing clocks different in timing from each other and equivalent in number to the number of FIFO memories constituting each storage means, and means for allocating and assigning the writing clocks to the plurality of FIFO memories constituting each storage means.

28. The memory control device according to claim 19, wherein said reading clock generating means includes means for generating reading clocks different in timing from each other and equivalent in number to the number of FIFO memories constituting each storage means, and means for allocating and assigning the reading clocks to the plurality of FIFO memories constituting each storage means.

29. The memory control device according to claim 19, further comprising a common clock generating means shared by said writing clock generating means and said reading clock generating means, said common clock generating means generating a plurality of clocks different in timing from each other and equivalent in number to the number of FIFO memories constituting each storage means.

30. The memory control device according to claim 29, wherein:

each storage means includes three FIFO memories;
said clock generating means includes:
(a) a shift register of parallel output type having a plurality of stages and a data input terminal for shifting data among stages based upon the reference clock, an output signal from a first stage turning to a specified logic status when the data input terminal turns to a specified logic status, (b) an AND circuit receiving output signal from first and second stages of said shift register and having its output applied to the data input terminal of said shift register, (c) first latch means for latching an output signal from the first stage of said shift register based upon the reference clock,
(d) second latch means for latching the output from the first latch means based upon the reference clock, and
(e) third latch means for latching the output from the second latch means based upon the reference clock; and said memory control device further comprises means allocating and assigning signals corresponding to output signals from said first, second and third latch means as writing clocks to the three FIFO memories constituting each storage means, and means allocating and assigning signals corresponding to output signals from said first, second and third latch means as writing clocks to the three FIFO memories constituting each storage means.

31. The memory control device according to claim 19, further comprising means for applying a reading authorizing signal, for reading data at a common timing, to said plurality of storage means.

* * * * *